United States Patent Office 2,759,937
Patented Aug. 21, 1956

2,759,937

DIALKYL PYRIDAZINONYL PHOSPHATE ESTERS AND PROCESS OF MAKING SAME

Shirley Du Breuil, Stamford, Conn., assignor to American Cyanamid Company, New York, N. Y., a corporation of Maine No Drawing. Application March 21, 1955, Serial No. 495,776

8 Claims. (Cl. 260—250)

The present invention relates to new and useful phosphate esters and the method of preparation thereof.

These new esters are the O,O-dialkyl O-(6-pyridazinon-3-yl) phosphates which conform to the general formula

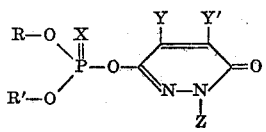

in which R and R' are chosen from the group of lower alkyl radicals such as methyl, ethyl, propyl and butyl, X represents a member of the group consisting of sulfur and oxygen, Y and Y' represent a member of the group consisting of hydrogen, bromine and chlorine, and Z represents a radical chosen from the group consisting of phenyl, nitrophenyl, bromophenyl, chlorophenyl, and alkyl radicals having from one to twelve carbon atoms.

The above compounds may be readily prepared by reacting a dialkyl phosphoric chloride of the formula

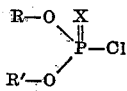

in which X, R and R' have the meaning shown above, with an alkali metal salt of an hydroxypyridazinone of the formula

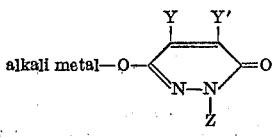

in which Y, Y' and Z have the meaning shown above, in an inert solvent.

The compounds of the present invention may also be prepared by reacting the dialkyl phosphoric chloride with the hydroxypyridazinone in an inert solvent in the presence of a hydrogen chloride acceptor such as the alkali metal and alkaline earth metal carbonates. For example, in the preparation of O,O-diethyl O-(1-phenyl-6-pyridaz-inon-3-yl) thiophosphate, the reaction may be illustrated as follows:

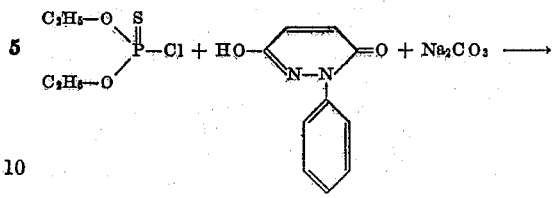

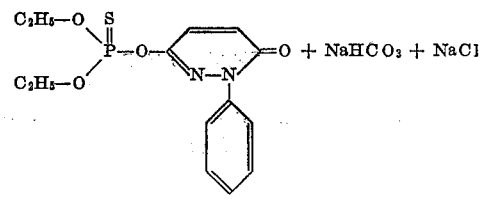

The reaction may be carried out at temperatures within the range of from about 10° to 100° C., and preferably between 20° and 60° C.

Suitable inert solvents for the reaction include water, dimethyl formamide, dimethyl sulfoxide, dioxane, acetonitrile, benzene, toluene, xylene, the lower aliphatic monohydric alcohols, ketones such as acetone, methyl ethyl ketone, methyl isobutyl ketone, methyl benzyl ketone and cyclohexanone, and aliphatic esters such as ethyl acetate, 2-ethylhexyl acetate, methyl propionate, ethyl butyrate and isopropyl butyrate.

The hydroxypyridazinones utilized in the present process are readily prepared by the reaction of maleic anhydride and substituted maleic anhydrides with monosubstituted hydrazines or the mineral acid salts thereof, in aqueous media or other suitable solvent such as alcohol or glacial acetic acid. The reaction of maleic anhydride with methylhydrazine sulfate to produce 6-hydroxy-2-methyl-3-pyridazinone may be illustrated as follows:

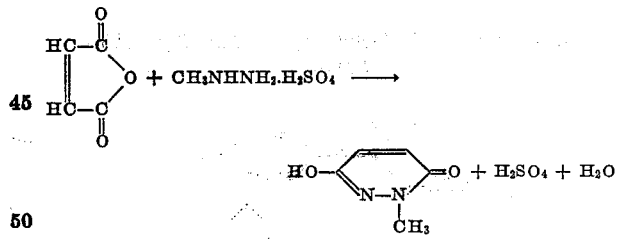

The alkali metal salts of the hydroxypyridazinones may be prepared by reaction of the hydroxypyridazinone with an alkali metal hydroxide in water, followed by precipitation with acetone.

The following examples will further illustrate the invention.

EXAMPLE 1

O,O-diethyl O-(1-phenyl-6-pyridazinone-3-yl) phosphate

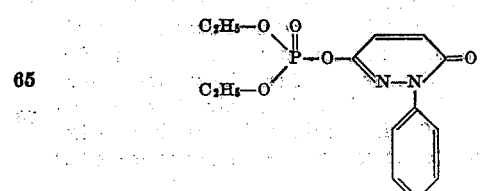

The sodium salt of 6-hydroxy-2-phenyl-3-pyridazinone (0.12 mol) was dissolved in 230 cc. of anhydrous dimethyl formamide. To the clear yellow solution there was added 0.12 mol of O,O-diethyl phosphoric chloride, whereupon the temperature of the mixture rose to 37.5° C. After stirring for a period of about three hours, the reaction mixture was filtered and the solvent was removed from the filtrate under vacuum. The residue was dissolved in 100 cc. of toluene, and the solution was washed with 5% aqueous sodium carbonate and then with saturated aqueous sodium chloride solution. The toluene solution was dried with anhydrous magnesium sulfate, and evaporated to give the desired product (89% yield), an orange-colored oil having a refractive index $n_D^{25}$ 1.5374.

*Analysis.*—Theory: N, 8.64; P, 9.55. Found: N, 8.52; P, 8.66.

EXAMPLE 2

*O,O-dimethyl O-(1-phenyl-6-pyridazinon-3-yl) thiophosphate*

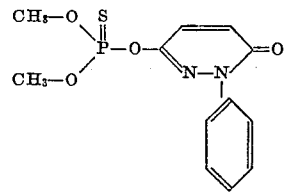

The procedure of Example 1 was employed using the sodium salt of 6-hydroxy-2-phenyl-3-pyridazinone (0.12 mol) and O,O-dimethyl thiophosphoric chloride (0.12 mol). The product (63.2% yield), after recrystallization from ethanol by the addition of water, melted at 46.5–47° C.

*Analysis.*—Theory: N, 8.97; P, 9.92. Found: N, 9.06; P, 10.17.

EXAMPLE 3

*O,O-diethyl O-(1-phenyl-6-pyridazinon-3-yl) thiophosphate*

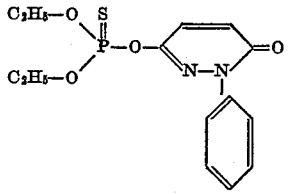

A mixture of 6-hydroxy-2-phenyl-3-pyridazinone (0.1 mol) and anhydrous sodium carbonate (0.1 mol) was suspended in 175 cc. of anhydrous dimethyl formamide. O,O-diethyl thiophosphoric chloride (0.1 mol) was added, and the reaction mixture was stirred at room temperature for 21 hours, then filtered, and the solvent removed under vacuum. The resulting semi-crystalline residue was treated with 100 cc. of toluene and the mixture was again filtered. The toluene solution was washed with 10% aqueous sodium carbonate, and then with saturated aqueous sodium chloride solution. The solvent was evaporated to give a 69.4% yield of the desired product. After recrystallization from methanol, the compound melted at 56–57° C.

*Analysis.*—Theory: N, 8.23; P, 9.10. Found: N, 8.28; P, 9.12.

The phosphate esters of the examples listed in the following table were prepared according to the procedure of Example 3 employing equimolar quantities of the dialkyl phosphoric chloride, hydroxypyridazinone and sodium carbonate.

| Example Number | Phosphate Ester | Refractive Index or Melting Point | Percent Yield |
|---|---|---|---|
| 4 | (C₂H₅O)₂P(S)—O—[pyridazinone, N-CH₃, =S] | $n_D^{25}$ 1.5133 | 68.4 |
| 5 | [(CH₃)₂CHO]₂... [(CH₃)₂CHO]₂ P(S)—O—[pyridazinone, N-CH₃, =O] | 37–38.5° C. | 73.3 |
| 6 | (C₂H₅O)₂P(S)—O—[pyridazinone, Br, Br, N-CH₃, =O] | 67–68° C. | 90.3 |
| 7 | (C₂H₅O)₂P(S)—O—[pyridazinone, N-C₁₂H₂₅, =O] | $n_D^{25}$ 1.4843 | 30.6 |
| 8 | (C₂H₅O)₂P(S)—O—[pyridazinone, Cl, N-phenyl, =O] | 82.5–83° C. | 87.0 |
| 9 | (C₂H₅O)₂P(S)—O—[pyridazinone, Cl, N-phenyl, =O] | $n_D^{23}$ 1.5753 | 85.6 |
| 10 | (C₂H₅O)₂P(S)—O—[pyridazinone, N-(p-Br-phenyl), =O] | 67–67.5° C. | 54.5 |
| 11 | (C₄H₉O)₂P(S)—O—[pyridazinone, N-(p-NO₂-phenyl), =O] | 32–32.5° C. | 83.5 |

Other typical phosphate esters of the present invention include those in which the Y and Y' substituents are radicals such as —NH₂, —CN, —COOH, —COOC₂H₅, —CH₃, —CH(CH₃)₂,

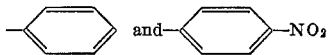

and the Z substituent is a radical such as —C₄H₉, —C₈H₁₇, —CH₂OH, —CH₂CH₂OH, —CH₂CH₂N(CH₃)₂, —CH₂N(CH₃)₂,

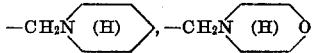

—CH₂SC₂H₅, —CH₂SC(CH₃)₃,

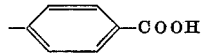

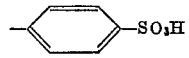

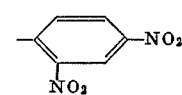

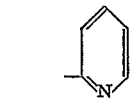

and

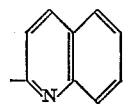

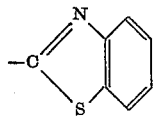

The compounds of the present invention are highly active insecticides and acaricides, and may be used as sprays in organic solvents, as emulsions in water or other non-solvents, or on solid carriers such as clays, talcs, diatomaceous earths and the like.

The marked activity of the phosphate esters in controlling various insects and mites is illustrated as follows:

*Aphis rumicis.*—100% kill with esters of Examples 1, 3, 4, 5 and 10 above at a concentration of 0.01% in a solvent carrier consisting of 65% acetone and 35% water.

*Tribolium confusum.*—100% kill with esters of Examples 3 and 4 above at a concentration of 1.0% on solid carriers such as pyrophyllite and Attapulgus clay.

*German cockroach.*—90 to 100% kill with esters of Examples 1, 3, 4, 5 and 10 above at a concentration of 1.0% on solid carriers such as pyrophyllite, Attapulgus clay and fuller's earth.

*Milkweed bug.*—100% kill with esters of Examples 1, 3, 4, 5 and 10 above at a concentration of 1.0% on solid carriers such as talc, fuller's earth and pyrophyllite.

*Two-spotted mite.*—100% kill with esters of Examples 1, 3, 4, 5 and 10 above at a concentration of 0.1% in a solvent carrier consisting of 65% acetone and 35% water.

While the invention has been described with particular reference to specific embodiments, it is to be understood that it is not to be limited thereto, but is to be construed broadly and restricted solely by the scope of the appended claims.

I claim:

1. A phosphate ester of the general formula

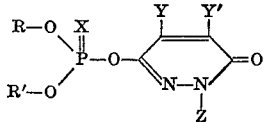

wherein R and R' represent a member of the group consisting of lower alkyl radicals, X represents a member of the group consisting of sulfur and oxygen, Y and Y' represent a member of the group consisting of hydrogen, bromine, and chlorine, and Z represents a radical chosen from the group consisting of phenyl, nitrophenyl, bromophenyl, chlorophenyl, and alkyl radicals having from one to twelve carbon atoms.

2. O,O-dimethyl O-(1-phenyl-6-pyridazinon-3-yl) thiophosphate.

3. O,O-diethyl O-(1-phenyl-6-pyridazinon-3-yl) thiophosphate.

4. O,O-diethyl O-(1-methyl-6-pyridazinon-3-yl) thiophosphate.

5. O,O-diethyl O-(1-phenyl-6-pyridazinon-3-yl) phosphate.

6. O,O-diisopropyl O-(1-methyl-6-pyridazinon-3-yl) thiophosphate.

7. A method of preparing a phosphate ester of the general formula

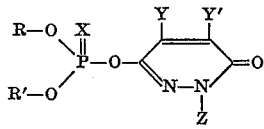

wherein R and R' represent a member of the group consisting of lower alkyl radicals, X represents a member of the group consisting of sulfur and oxygen, Y and Y' represent a member of the group consisting of hydrogen, bromine and chlorine, and Z represents a radical chosen from the group consisting of phenyl, nitrophenyl, bromophenyl, chlorophenyl, and alkyl radicals having from one to twelve carbon atoms, which comprises reacting a dialkyl phosphoric chloride of the formula

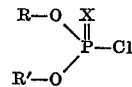

in which X, R and R' have the meaning shown above, with an alkali metal salt of an hydroxypyridazinone of the formula

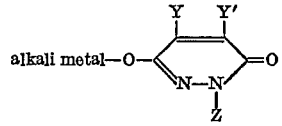

in which Y, Y' and Z have the meaning shown above, in an inert solvent, and recovering the thus-formed phosphate ester from the reaction mixture.

8. The method of claim 7 in which the reaction is carried out at a temperature within the range of from about 10° C. to 100° C.

No references cited.